July 25, 1944.  R. F. WILSON ET AL  2,354,442
INNER TUBE AND METHOD OF MAKING THE SAME
Filed April 10, 1942  2 Sheets-Sheet 1
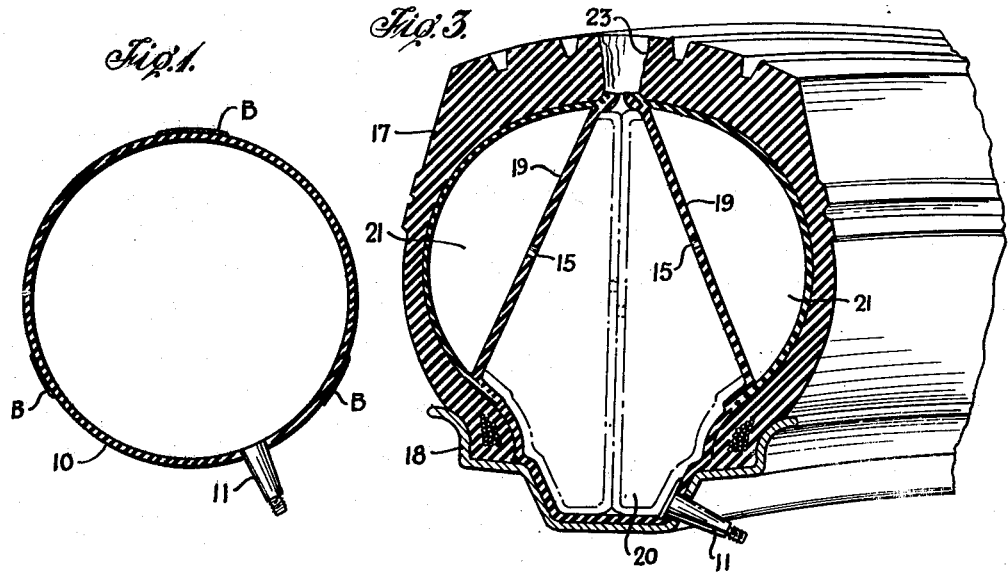
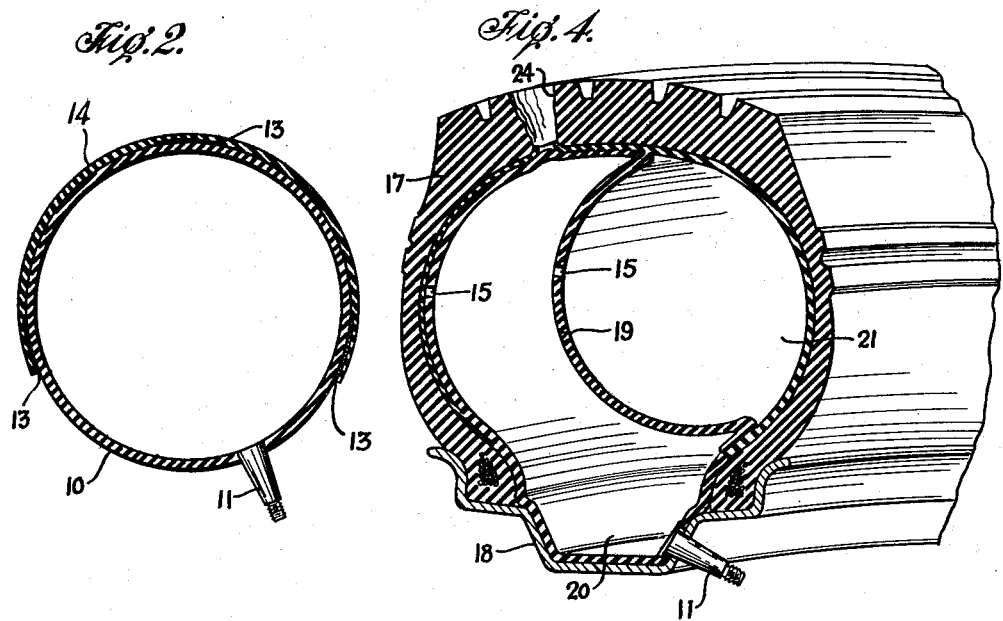
Inventor
ROBERT F. WILSON
AND
WILLARD L. KLINGMAN
By
Attorney July 25, 1944.  R. F. WILSON ET AL  2,354,442
INNER TUBE AND METHOD OF MAKING THE SAME
Filed April 10, 1942   2 Sheets-Sheet 2

Inventor
ROBERT F. WILSON
AND
WILLARD L. KLINGMAN
By Ely & Frye
Attorney

Patented July 25, 1944

2,354,442

UNITED STATES PATENT OFFICE 2,354,442

INNER TUBE AND METHOD OF MAKING THE SAME

Robert F. Wilson and Willard L. Klingman, Akron, Ohio, assignors to The Firestone Tire & Rubber Company, Akron, Ohio, a corporation of Ohio Application April 10, 1942, Serial No. 438,504

7 Claims. (Cl. 154—14)

This invention relates to inner tubes and to methods of manufacturing the same, and more especially it relates to compartment inner tubes comprising a plurality of circumferentially extending compartments or chambers, and to improved procedure for the manufacture thereof.

The chief object of the invention is to increase the safety of motor vehicles. More specifically the invention aims to provide an inner tube for pneumatic tires that cannot lose more than half its internal pressure from any single puncture or blow out; that is so constructed that the pressure in the tube automatically is equalized throughout the tube after a compartment thereof is deflated through puncture or blowout; that automatically seals the puncture or blowout after the ruptured compartment is deflated; and to provide a simple method for the facile manufacture of inner tubes of the character mentioned. Other objects will be manifest.

Of the accompanying drawings:

Figure 1 is a transverse section of a vulcanized annular rubber tube, showing the first steps in the manufacture of the improved inner tube;

Figure 2 is a view of the structure shown in Figure 1 in a succeeding stage of manufacture;

Figure 3 is a fragmentary, sectional, perspective view of a pneumatic tire mounted upon a rim, and the improved inner tube mounted in said tire, the latter showing a blowout on the centerline of its periphery, and showing internal partitions in normal position in full lines, their positions following a blowout being indicated by broken lines;

Figure 4 shows the same elements that are shown in Figure 3, the tire showing a blowout in its periphery, at one side of the centerline thereof;

Figure 5:
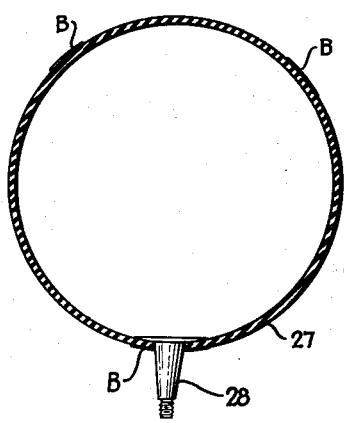
Figure 5 is a view similar to Figure 1 showing the first steps in the manufacture of a modified embodiment of the invention.
Figure 7:
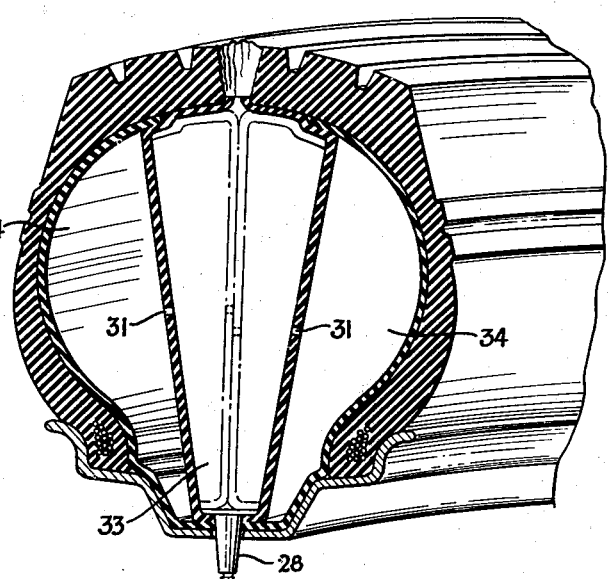
Figure 8:
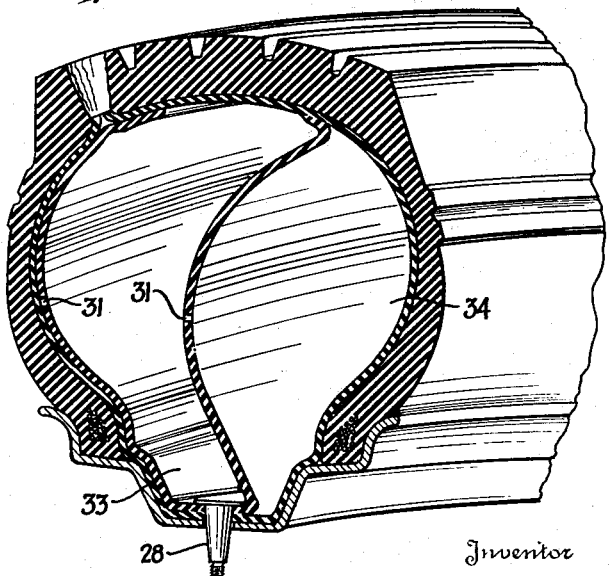

Figure 7 is a view similar to Figure 3 showing the modified inner tube as it appears in a tire casing having a blowout on the centerline of its periphery, and showing internal partitions in normal position in full lines, their positions following a blowout being indicated by broken lines; and Figure 8 is a view similar to Figure 4 showing the modified inner tube as it appears in a tire casing having a blowout at one side of the centerline of its tread.

Referring to the drawings, the first step in the manufacture of the improved inner tube is to provide an annular, vulcanized rubber tube 10, the same being slightly smaller in size than standard inner tubes designed for use in the same size tires. The tube 10 may be made by any known or preferred method, and in Figure 1 is shown as including a valve stem 11 that is disposed at an angle to the plane of the tube, although it may be positioned in the plane of the tube if so desired. The tube 10 is then buffed circumferentially in three separated regions, namely, along the centerline of the periphery of the tube, and along each of the regions that are disposed adjacent the beads of a tire when the tube is mounted therein, said buffed regions being about 120° apart transversely of the tube, and being indicated at B, B in Figure 1 of the drawings.

The next step in the manufacture of the inner tube is the application of suitable adhesive, such as rubber cement, to the buffed regions B of the tube, said adhesive being indicated at 13, 13 Figure 2. Thereafter an endless band of unvulcanized sheet ruber 14 is applied circumferentially and symmetrically to the periphery of the tube 10, the respective lateral margins of the band 14 and the medial region thereof being adhered to the tube through the agency of the adhesive 13. Preferably a suitable lubricant is placed between the tube 10 and band 14 to prevent adhesion thereof except in those regions where the adhesive 13 is present. The assembled structure is then mounted in a tube mold and subjected to vulcanizing heat while pressure is maintained in the tube 10 sufficient to force the band 14 against the mold wall, whereby vulcanization of the band 14 is effected, and the band is united with the tube 10, in the circumferential regions B—B, by a vulcanized bond. There are respective small apertures, 15, 15, Figures 3 and 4, formed in the wall of the tube 10 beneath the band 14, at each side of the outer peripheral region of adhesion of the band and tube. The apertures 15 need not be symmetrically disposed, and they may be made by a hot wire that is inserted into the tube through the valve stem 11.

In Figures 3 and 4 the improved inner tube is shown as it appears when mounted for use within a tire casing 17, the latter being mounted upon a drop center tire rim 18. When the inner tube is inflated by means of the valve stem 11, some of the inflowing air passes through the respective apertures 15, with the result that pressure on opposite sides of the original tube 10, in the regions thereof between the points of attachment of the band 14, is equalized and said portions of the tube assume the chordal positions shown in full lines in Figure 3 while the band 14 is distended against the inner surface of the tire casing. Said chordal portions are indicated by the numerals 19, 19, and they divide the inflated tube into three compartments of which 20 is a central compartment and 21, 21 are respective lateral compartments of somewhat smaller size.

The functioning of the improved inner tube in case of puncture or blowout is shown in Figures 3 and 4 of which Figure 3 shows the result of a blowout on the centerline of the tire tread, said blowout being indicated at 23. The result of said blowout is to rupture the inner tube at the periphery of its central compartment 20, which causes rapid deflation of the latter, but the apertures 15 in the chordal portions 19 are so small in size as to prevent substantial escape of air from compartments 21 before the differential pressure in compartments 20, 21 forces said chordal portions into face to face engagement with each other, as indicated in broken lines in Figure 3. When said chordal portions are thus disposed, further escape of air through apertures 15 is prevented, and the air in compartments 21, amounting to about half of the original amount of air in the tube, will provide sufficient support for the vehicle to prevent the latter from going out of control, and will keep the tire on the rim until repair can be made.

The action of the inner tube in cases where a blowout occurs either side of the centerline of the tire tread is shown in Figure 4, the blowout being indicated at 24. The result of said blowout is to rupture the outer wall of the inner tube and thus to cause rapid deflation of the contiguous compartment 21. The differential fluid pressure in compartment 20 and deflating compartment 21 causes the chordal wall 19 of the latter to distend into face to face engagement with the ruptured, peripheral wall of the tube, with the result that aperture 15 in said chordal wall is closed and further escape of air from the tube is prevented. At the same time the expansion of the air in the remaining compartment 21 causes chordal wall 19 thereof initially to assume the distended position shown in Figure 4. Thus more than half of the original air remains in the inner tube and the usual results of puncture and blowouts are avoided. Eventually the escape of air from remaining compartment 21 to compartment 20, through aperture 15, will equalize the pressure in the two compartments and enable the distended intervening wall 19 to resume its normal position as shown in Fig. 3.

The first step in the manufacture of the modified embodiment of the invention shown in Figures 5 to 8 inclusive is to provide an annular vulcanized rubber tube 27, the same being slightly smaller in size than standard inner tubes designed for use in the same size tires. The tube 27 as shown includes a valve stem 28 that extends radially inwardly in the medial plane of the tube. Next the tube 27 is buffed circumferentially in three separated regions, namely, along the centerline of the inner circumference of the tube, and along the periphery of the tube at each side of the centerline thereof, approximately in the regions that are coincident with the shoulders of the tread portion of a tire in which the tube ultimately is used. The buffed regions are indicated at B, B in Figure 5 of the drawings.

Figure 6:
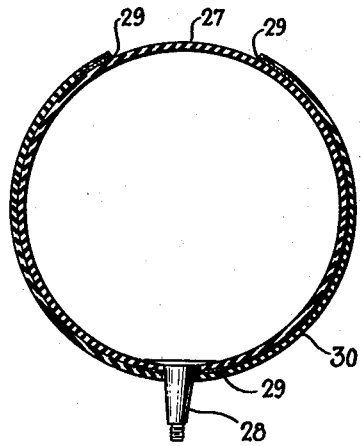
Figure 6 is a view of the structure shown in Figure 5 in a succeeding stage of manufacture.

The next step in the manufacture of the improved tube is the application of adhesive to the buffed regions B of the tube 27, said adhesive being indicated at 29, 29, Figure 6. Thereafter an endless band of unvulcanized sheet rubber 30 is applied circumferentially and symmetrically to the inner circumference of the tube 27, the respective lateral margins of the band and the medial region thereof being ahered to the tube through the agency of the adhesive 29. Suitable lubricant is placed between the tube 27 and band 30 to prevent adhesion thereof except in the regions where the adhesive 29 is present. Thereafter the assembled tube is vulcanized in a mold in the manner previously described, after which respective apertures 31, 31 are formed in the opposite walls of the original tube 27, beneath the band 30.

The modified embodiment of the invention possesses all the advantages inherent in the preferred embodiment, and functions exactly in the same manner as the latter. As is most clearly shown in Figure 7, when the modified inner tube is inflated within a tire, it is so distended as to form three circumferential compartments 33, 34 and 34 respectively, of which the shape of the middle compartment 33 differs from the middle compartment 20 of the tube shown in Figure 3 chiefly in having a greater area of its outer periphery exposed to the tire casing.

In an alternative method of fabricating the structures shown in Figures 2 and 6 respectively, the outer annular bands, 14 and 30 are first made up as annular rubber tubes and vulcanized, after which a circumferential segment is cut therefrom and the remainder of the tube mounted upon the foundation tube 10 or 27. Adhesion of the respective parts is effected with air-curing rubber cement. When this method is used, the apertures, 15 or 31, in the tubes may be formed before the vulcanized bands are applied, and vulcanization of the assembled tubes is not required. In appearance the tubes made by this method are identical with those shown in Figs. 2 and 6 respectively so that illustration thereof is not believed to be necessary.

The invention makes for safety of life and property and achieves the other advantages set out in the foregoing statement of objects.

Other modification may be resorted to without departing from the spirit of the invention or the scope of the appended claims, which are not limited wholly to the specific construction shown or exact procedure described.

What is claimed is:

1. An inner tube for pneumatic tires, said inner tube comprising an annular, tubular, rubber structure, means for inflating the same, an annular, transversely arcuate, elastic band mounted upon the exterior face of said tube circumferentially thereof and locally bonded thereto at its lateral margins and along its centerline, there being a relatively small aperture in said tube between the centerline of the overlying band and each of the lateral margins thereof.

2. An inner tube for pneumatic tires, said inner tube comprising an annular, tubular, rubber structure, means for inflating the same, an annular, transversely arcuate, elastic band symmetrically mounted upon the periphery of said tube circumferentially thereof and locally bonded thereto at its lateral margins and along its centerline, there being a relatively small aperture in said tube between the centerline of the overlying band and each of the lateral margins thereof.

3. An inner tube for pneumatic tires, said inner tube comprising an annular, tubular rubber structure, means for inflating the same, an annular, transversely arcuate elastic band symmetrically mounted upon the entire inner circumferential region of said tube and locally bonded thereto along its lateral margins and along its centerline, there being a relatively small aperture in said tube between the centerline of the band and each of the lateral margins thereof.

4. The method of making inner tubes for pneumatic tires which comprises providing an annular vulcanized rubber tube having an inflating stem, mounting an endless, transversely arcuate rubber band upon the outer surface of the tube, circumferentially thereof, locally bonding said band to the tube along its respective lateral margins and along its centerline, and forming a relatively small aperture in said tube between the centerline of the overlying band and each of the lateral margins thereof.

5. The method of making inner tubes which comprises providing an annular vulcanized rubber tube having an inflating stem, mounting an endless, transversely arcuate, unvulcanized rubber band upon the outer surface of the tube, circumferentially thereof, locally adhering said band to the tube along its respective margins and along its centerline, confining the assembled structure and subjecting it to heat and pressure to effect vulcanization of the band, and then forming a relatively small aperture in said tube between the centerline of the overlying band and each of the lateral margins thereof.

6. The method of making inner tubes which comprises providing an annular, vulcanized rubber tube having an inflating stem, locally buffing the outside of said tube circumferentially in three concentric, spaced-apart regions, applying adhesive to said buffed regions, mounting an endless, transversely arcuate, unvulcanized rubber band upon said tube and adhering it thereto along its centerline and respective marginal portions by means of the adhesive on the tube, confining the assembled structure and subjecting it to heat and internal pressure to effect vulcanization of the band and to vulcanize it to the tube, and then forming a relatively small aperture in the tube wall between the centerline of the overlying band and each of the lateral margins thereof while utilizing the inflating stem to give access to the said tube wall.

7. A method as defined in claim 6 in which the apertures in the tube wall are formed by burning.

ROBERT F. WILSON.
WILLARD L. KLINGMAN.